June 12, 1956   K. H. BURGSMULLER   2,749,807
DEVICE FOR CUTTING LONG THREADS
Filed Oct. 18, 1952   2 Sheets-Sheet 1
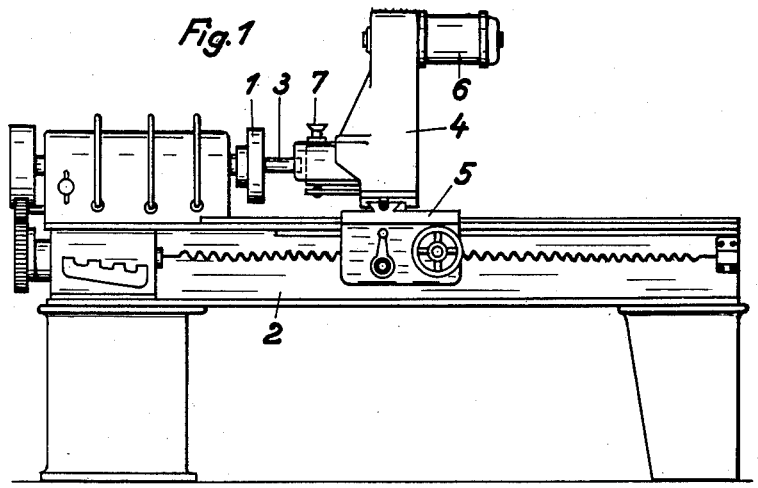
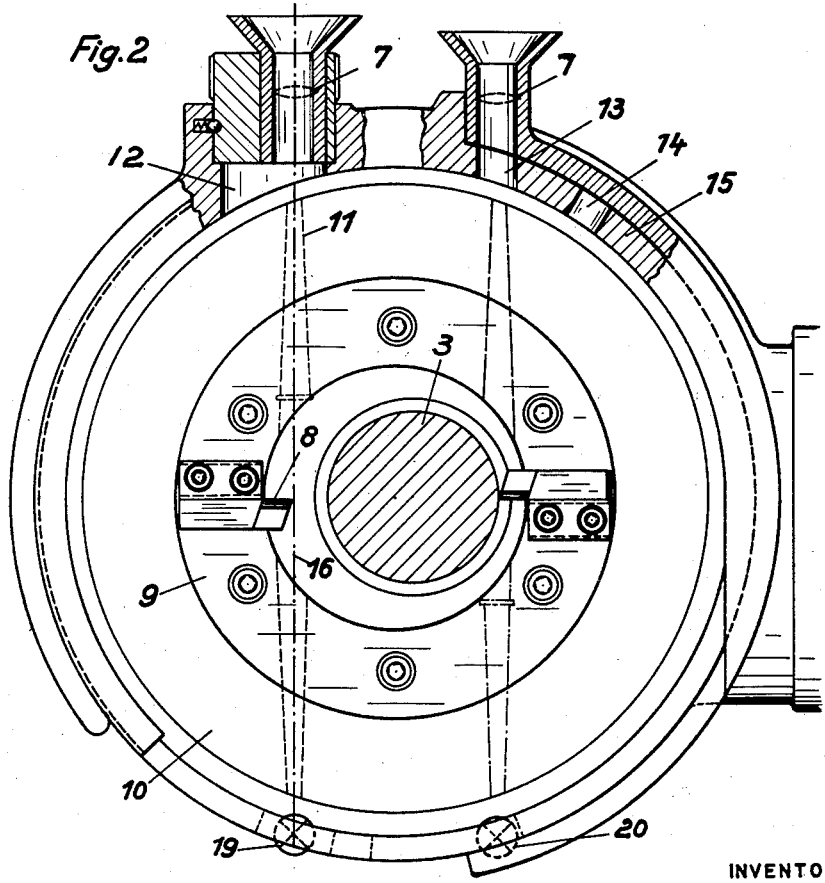
INVENTOR
KARL HEINRICH BURGSMÜLLER
ATTORNEY June 12, 1956  K. H. BURGSMULLER  2,749,807
DEVICE FOR CUTTING LONG THREADS
Filed Oct. 18, 1952  2 Sheets-Sheet 2
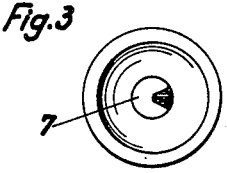
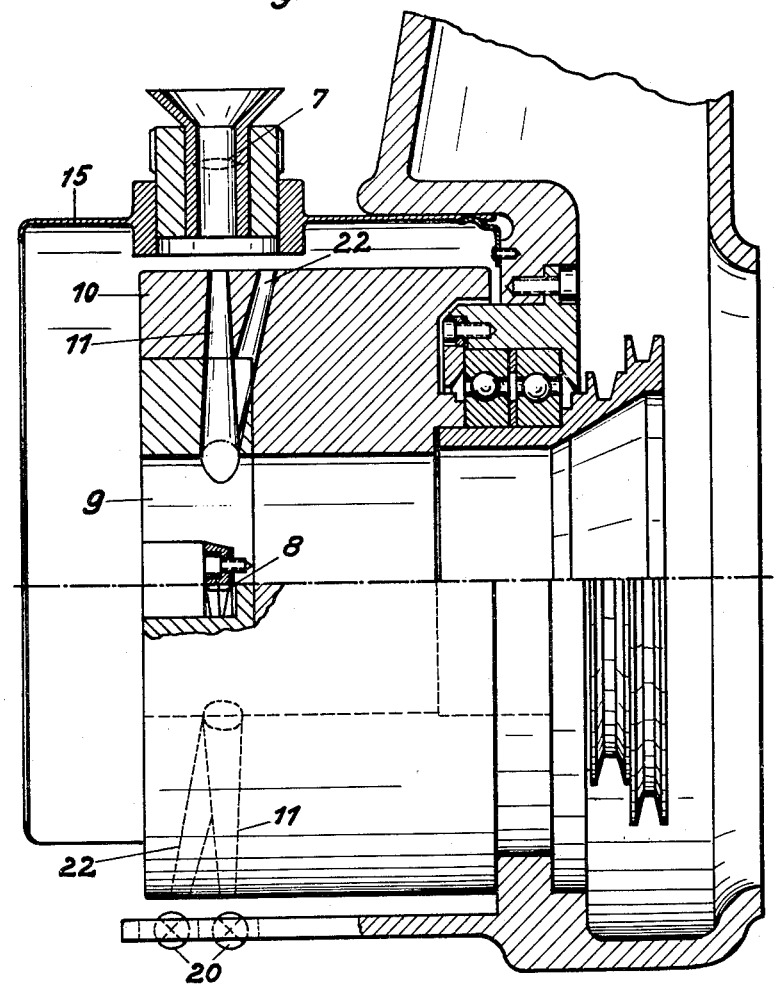
INVENTOR
KARL HEINRICH BURGSMÜLLER
ATTORNEY United States Patent Office 2,749,807
Patented June 12, 1956

2,749,807

DEVICE FOR CUTTING LONG THREADS

Karl Heinrich Burgsmuller, Kreiensen am Harz, Niedersachsen, Germany, assignor to Gomerue Establishment, Vaduz, Liechtenstein Application October 18, 1952, Serial No. 315,484

3 Claims. (Cl. 90—11.4)

This invention relates to certain improvements in a machine for cutting long threads, and has particular reference to a device for controlling and checking the setting of the cutting tools while in motion, and deals more particularly with a device of the kind in which a tool, or tools, rotate eccentrically around a workpiece at a relatively high rate of speed, removing a short chip only with each revolution, while said workpiece rotates at a relatively slow rate of speed.

In the present art it is extremely difficult to replace a worn, or broken tool to its correct position, so that the new or reground tool will accurately fit the correct profile of the thread being cut.

In order to avoid said difficult "retracing" of a substitute tool, the operator of the machine was inclined to complete the entire length of the thread without regard to the degree of wear or condition of the tool and the deviations from the standard dimensions of said thread being cut. If said deviations were in excess of given tolerances said operator would recut said thread in a subsequent operation.

In the cutting of long threads on high strength material, the difficult cutting operation often causes premature failure of a tool resulting in expensive workpieces becoming scrap.

The present devices for cutting threads by means of tools rotating eccentrically around a workpiece at a relatively high speed and other machines with rotary cutting tools, are equipped with means which permit adjusting the position of a tool or milling cutter axially, and radially, relative to said workpiece. Said means consisting of precision feed spindles, and scales. It should be assumed that said means are sufficient for accurately continuing the thread started with the previous tool. I have found from experience that said present means were not sufficient for accurate adjustment of said cutting tools. The deviations of said newly set cutting tool from its correct position in relation to said workpiece cannot be ascertained, eliminated or corrected while the machine is at stand still. I do not intend to give an exhaustive explanation of said phenomenon. It is assumed that the reasons for said phenomenon are as follows:

1. The circle described by the tool point expands during operation due to the high rate of speed of said tool.
2. The reactions to the stresses occurring only during operation in the gear feed, in the lead screw bearing, in the locknut of the lead screw, in the carriage guide and finally in the bearings of the fly wheel ring tool holder, cannot be ascertained with full accuracy and compensated for.
3. In the attempt to set said cutting tool while the machine is at stand still, said tool will generally crumble upon the slightest contact of its cutting edges with the workpiece.

Said observations form the basis of the present invention and in machines of the kind referred to, I provide means for indicating, and adjusting, the position of said tools relative to the thread flanks on the workpiece, while rotating around said workpiece. Said workpiece may, or may not, rotate during said adjusting procedure.

A further feature of the invention is to provide means for setting, checking and to show the relative positions of several cutting tools of a multiple tool arrangement, each in relation to the thread being cut on said workpiece, while said multiple tool arrangement is rotating around said workpiece.

To carry out the spirit and scope of my invention I provide a tool holder ring mounted in a bearing housing carrying said cutting tools. Said tool holder ring is designed to act as a stroboscope and permits observation of the tool point or points while said tool holder ring is in motion.

A bore traverses said tool holder ring, said bore being disposed in a plane located at right angles, or nearly at right angles, to the axis of the tool and may be continued through various preferred parts of said bearing housing. The observation ports thus formed may be equipped with an optical device.

Said stroboscopic device is for the following purposes:

1. To make the position of said tools visible, in relation to said workpiece during the rotary motion of said tools.
2. To determine the amount of said deviation of new or replaced tools, in relation to said workpiece occurring during the rotary motion of said tools.
3. To show the wear of said tools and the resulting deviation of said tools from the correct profile of the thread while it is being cut.
4. When several tools are used simultaneously their mutual position can be controlled while rotating.

The device may be built so that the optical device may be applied alternately to the various points of observation or adaptable to serve a plurality of positions of observation similar to a revolving lens head of a microscope.

A source of light may be arranged underneath the point to be observed and may be operatively connected to the movable optical device.

Other and further objects, features and advantages of the invention will be pointed out hereinafter and appear in the appended claims forming part of the application.

In the accompanying drawings several preferred embodiments of the invention are shown by way of illustration and not by way of limitation.

Fig. 1 is a side elevation of a standard lathe, with my novel thread cutting device mounted thereon, Fig. 2 is an end view, partly in section, of a thread cutting device, and also showing my novel device for observing the tool, in two different positions, Figs. 3 and 4 show the tool as seen through my novel device, Fig. 5 is a longitudinal section of my thread cutting device showing my novel device for observing several cutting tools.

Similar reference numerals denote similar parts in the different views.

Reading on the drawings Fig. 1, shows workpiece 3, to be threaded, held in chuck 1, of lathe 2. Threading device 4, is mounted on carriage 5, of lathe 2, and revolvable and slidable thereon. The cutting tool of said threading device 4, is driven by motor 6. With optical device 7, the position of said cutting tool can be observed in relation to said workpiece 3.

Fig. 2, shows tool 8, to be observed clamped in tool holder ring 9, set in fly-wheel ring 10. Bore 11, passing through said tool holder ring 9, and said fly-wheel ring 10, is located in a plane, said plane is at right angle, or nearly at right angle, to the tool axis and can be aligned with bores 12, 13, and 14, in bearing housing 15. Axis 16, of bore 11, passes through the tip of said tool 8, set into said bore 12, is optical device 7, in the form of a movable head which permits, through a corresponding position of said bore 11, to observe the tip of said tool 8, magnified in size, if desired, and to check whether the shape and position of said tool 8, are correct as to specified dimensions and profile. To facilitate this control, said shape or position may be engraved or etched into said optical device 7. (See Fig. 3.)

If desirable, optical device 7, may be attached to the bores 13 and 14, to observe said tool 8, in its most advanced position in the thread, or if positioned correspondingly shortly before or after said most advanced position. (See Fig. 4.)

Still reading on Fig. 2, a source of light 19, and 20, is provided in said bearing housing 15, below the lower openings of said bores 12, and 13, said source of light 19, and 20, permits the observation of the profile of said tool 8, in its operating position in a very favorable manner.

When said bore 11, in said tool holder ring 9, coincides with said bore 12, in said bearing housing 15, said tool 8, appears in the field of observation of the optical device 7, and the contours of said tool 8, are sharply outlined by the said source of light 19. Because of the rapid rotation of said tool 8 (performs 20 to 60 revolutions per second), a stationary image of said tool 8, is seen by the eye, and the shape and position of said tool 8, can be clearly observed.

Correspondingly said tool 8, can be observed in its most advanced position in said thread, when said optical device 7, is used in the position where said bore 11, in said tool holder ring 9, coincides with said bore 13, in said bearing housing 15. Looking through said optical device 7, an accurate adjustment of said tool 8, both axially and radially relative to workpiece 3, can be made. (Fig. 2.)

When said optical device 7, is moved to coincide with bore 14, an unobstructed view of the profile of said thread can be had, because the point of observation on said thread is located closely behind said most advanced position of said tool 8, in said thread, as said tool 8, at this point has already left said workpiece 3. The profile of said tool 8, is again sharply silhouetted by said source of light 20, said source of light 20, is shiftable together with the optical device 7.

Reading on Fig. 5, shows an embodiment of the invention for several cutting tools 8, and shows clearly which one of said tools 8, has to be adjusted. To accomplish this an additional source of light 20, and an additional light channel 22, is provided for each of said tools 8, and make it possible to observe said tools 8, at said points of observation selectively and separately.

While the invention has been described in detail with respect to two preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. A device of the kind described for observation of a tool used primarily for cutting threads while said tool is stationary, or in motion, and as an aid to set up of a tool, comprising, in combination, coinciding bores disposed in a plane located substantially perpendicular to the axis of said cutting tool traversing through a tool holder ring and through a bearing housing, said housing bore having an optical means with interchangeable reticles showing correct thread profiles mounted in said bore and a light source placed below the lower portion of said bore effecting a stroboscopic means for observation.

2. A device according to claim 1, for use in connection with a plurality of cutting tools and coinciding bores, one for each cutting tool, and a plurality of light sources, one for each bore, and operable individually or in combination, thereby effecting a selective stroboscopic means for observation.

3. A method for viewing and comparing against standards, cutting tools and threads being cut, and for selective stroboscopic observation of said cutting tools while in motion and adjusting said cutting tools while standing still, so that said cutting tools will conform to the correct position during the rotation of the tool holder ring to be able to compensate for the elongation of the circumference of said tool holder ring caused by centrifugal forces, and further to be able to compensate for stresses acting on the carriage while in motion.

References Cited in the file of this patent

UNITED STATES PATENTS

| 1,507,235 | Hall | Sept. 2, 1924 |
| 1,648,369 | Svedberg et al. | Nov. 8, 1927 |
| 2,209,723 | Ayres | July 30, 1941 |